(12) United States Patent
Hwang et al.

(10) Patent No.: US 11,124,049 B2
(45) Date of Patent: Sep. 21, 2021

(54) SUN VISOR STORED IN AND WITHDRAWN FROM A VEHICLE ROOF PANEL

(71) Applicants: HYUNDAI MOTOR COMPANY, Seoul (KR); KIA MOTORS CORPORATION, Seoul (KR); Yong San Co., Ltd., Ulsan (KR)

(72) Inventors: Jin Ho Hwang, Seoul (KR); Dae Ig Jung, Suwon-si (KR); Seung Hyeok Chang, Suwon-si (KR); Min Ho Cho, Suwon-si (KR); Hyung Jin Kim, Seoul (KR); Sang Hoon Lee, Cheonan-si (KR)

(73) Assignees: HYUNDAI MOTOR COMPANY, Seoul (KR); KIA MOTORS CORPORATION, Seoul (KR); Yong San Co., Ltd., Ulsan (KR)

( * ) Notice: Subject to any disclaimer, the term of this patent is extended or adjusted under 35 U.S.C. 154(b) by 0 days.

(21) Appl. No.: 16/694,268

(22) Filed: Nov. 25, 2019

(65) Prior Publication Data

US 2020/0369127 A1    Nov. 26, 2020

(30) Foreign Application Priority Data

May 23, 2019  (KR) .......................... 10-2019-0060900

(51) Int. Cl.
*B60J 3/02* (2006.01)
*B60J 3/04* (2006.01)

(52) U.S. Cl.
CPC .............. *B60J 3/0243* (2013.01); *B60J 3/04* (2013.01)

(58) Field of Classification Search
CPC ...... B60J 3/0243; B60J 3/0239; B60J 3/0234; B60J 3/04; B60J 3/06
USPC ..................................... 296/97.2, 97.1, 97.4
See application file for complete search history.

(56) References Cited

U.S. PATENT DOCUMENTS

| | | | | |
|---|---|---|---|---|
| 4,988,139 A | * | 1/1991 | Yamada | B60J 3/0204 296/97.2 |
| 7,802,836 B2 | * | 9/2010 | Baudouin | B60J 3/0204 296/97.1 |
| 10,625,580 B1 | * | 4/2020 | Jones | B60J 3/04 |
| 2016/0253971 A1 | * | 9/2016 | Shepard | G06K 9/00228 345/667 |
| 2019/0322162 A1 | * | 10/2019 | Murase | G02F 1/1533 |

FOREIGN PATENT DOCUMENTS

| | | | |
|---|---|---|---|
| CN | 105416014 A | * | 3/2016 |
| CN | 108569112 A | * | 9/2018 |
| KR | 200263755 | | 2/2002 |
| KR | 20110112182 A | * | 10/2011 |

* cited by examiner

*Primary Examiner* — Jason S Morrow
*Assistant Examiner* — Kevin P Weldon
(74) *Attorney, Agent, or Firm* — Lempia Summerfield Katz LLC (57) ABSTRACT

A withdrawal-type sun visor includes a housing received in a roof panel. The housing has a storage recess therein. The withdrawal-type sun visor also includes a sun visor assembly configured to be received in the housing and to be withdrawn along a windshield glass of a vehicle. The sun visor assembly includes a display unit having a display region and includes a discoloration unit configured to enclose at least a portion of the display unit. The transmissivity of the discoloration unit is adjustable.

10 Claims, 5 Drawing Sheets

SUN VISOR STORED IN AND WITHDRAWN FROM A VEHICLE ROOF PANEL

CROSS-REFERENCE TO RELATED APPLICATION

This application claims, under 35 U.S.C. § 119(a), the benefit of priority to Korean Patent Application No. 10-2019-0060900 filed on May 23, 2019, the entire contents of which are incorporated herein by reference.

BACKGROUND

(a) Technical Field

The present disclosure relates to a withdrawal-type sun visor, and more particularly to a sun visor including a discoloration region and a display region, the sun visor configured to be withdrawn from a storage recess located inside a roof panel in order to block light and at the same time to provide a requested image through the display region.

(b) Background Art

In general, a sun visor is a panel- or pad-type driving assistant device mounted above a driver's seat. The sun visor is for blocking sunlight radiated from the front or side of the driver's seat, which may negatively affect driving. A sun visor is mounted for the passenger seat next to the driver, as well as the driver's seat.

Figure 1:
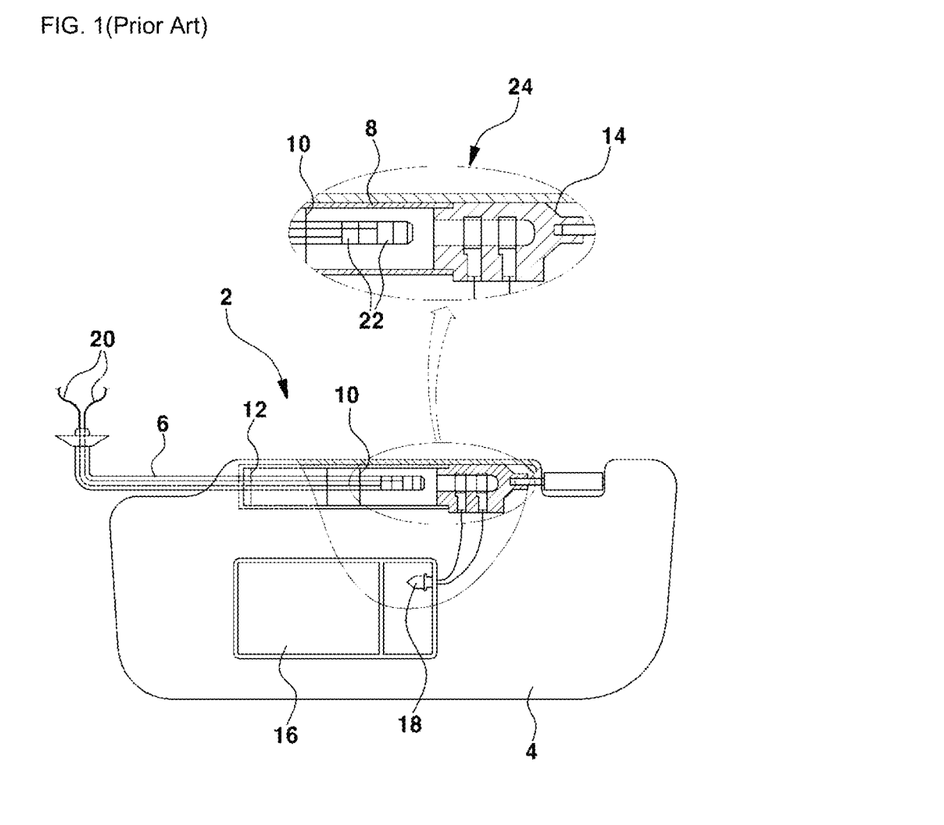
FIG. 1 is a view showing the construction of a conventional sun visor located in a vehicle.

In the conventional sun visor 2 shown in FIG. 1, a mirror 16 is attached to the front surface of a body 4 for the convenience of a driver. A lighting means 18 is provided such that the driver looks at himself/herself using the mirror at night.

However, such a lighting means 18 is used only for throwing light on the driver, and thus acts as a factor that deteriorates the quality of high-priced vehicles.

In addition, it is not easy for the driver to replace or maintain the lighting means mounted to the sun visor.

The above information disclosed in this Background section is provided only for enhancement of understanding of the background of the disclosure and therefore it may contain information that does not form the prior art that is already known in this country to a person of ordinary skill in the art.

SUMMARY OF THE DISCLOSURE

The prior art sun visor including the lighting means does not include a multimedia display means for improving user convenience. Moreover, no construction for discoloring the sun visor is provided such that the transmissivity of the sun visor is variable depending on the amount of light introduced from the outside. As a result, the conventional sun visor does not satisfy user demand or convenience.

The present disclosure has been made in an effort to solve the above-described problems associated with the prior art.

It is an object of the present disclosure to provide a withdrawal-type sun visor including a display unit provided for user convenience.

It is another object of the present disclosure to provide a withdrawal-type sun visor configured such that the amount of light introduced into a vehicle and the amount of light in the vehicle are compared to adjust the transmissivity of the sun visor.

The objects of the present disclosure are not limited to those described above. The objects of the present disclosure should be clearly understood from the following description and could be implemented by means defined in the claims and a combination thereof.

In one aspect, the present disclosure provides a withdrawal-type sun visor. The sun visor includes a housing received in a roof panel. The housing has a storage recess therein. The sun visor also includes a sun visor assembly configured to be received in the housing and to be withdrawn toward a front glass of a vehicle. The sun visor assembly includes a display unit having a display region and includes a discoloration unit configured to enclose at least a portion of the display unit. The transmissivity of the discoloration unit is adjustable.

The withdrawal-type sun visor may further include a driving unit connected to one end of the sun visor assembly for supplying a driving force such that the sun visor assembly is withdrawn.

The driving unit may include a first motor for linearly moving the sun visor assembly such that the sun visor assembly is movable to a withdrawn state. The driving unit may include a second motor for turning the sun visor assembly such that the sun visor assembly is switched to a turned state. The sun visor may include a controller configured such that the sun visor assembly is switched to the withdrawn state and is then switched to the turned state.

The second motor may be fastened to a cover unit configured to enclose the display unit.

The cover unit may be fastened to an inner shaft of a dual shaft, which extends through the cover unit. The discoloration unit may be fastened to an outer shaft, which is driven independently of the inner shaft. A damper unit may be provided between the inner shaft and the outer shaft.

When the dual shaft is turned by the second motor, the outer shaft and the inner shaft may be simultaneously turned. The outer shaft may be configured to be turned independently of the inner shaft.

The driving unit, which is fastened to one end of the sun visor assembly, may be configured to be moved along a rack gear, which is located inside the housing.

The withdrawal-type sun visor may further include a controller located inside the housing for adjusting the transmissivity of the discoloration unit.

The withdrawal-type sun visor may further include an automatic light sensor for measuring the amount of light.

The controller may be configured to adjust the transmissivity of the discoloration unit based on the amount of light received from the automatic light sensor.

The controller may be configured to compare the amount of light received through a portable device located in the vehicle with the amount of light received from the automatic light sensor and then to adjust the transmissivity of the discoloration unit.

The withdrawal-type sun visor may further include a guide unit provided at each side of the storage recess for guiding the sun visor assembly or the driving unit so as to be moved in the horizontal direction.

Other aspects and illustrative embodiments of the disclosure are discussed hereinbelow.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power such as, for example, a vehicle that is both gasoline-powered and electric-powered.

The above and other features of the disclosed embodiments are discussed hereinbelow.

BRIEF DESCRIPTION OF THE DRAWINGS

The above and other features of the present disclosure are now described in detail with reference to certain embodiments thereof illustrated in the accompanying drawings, which are given hereinbelow by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, reference is made in detail to various embodiments of the present disclosure, examples of which are illustrated in the accompanying drawings and described below. However, the present disclosure may be embodied in many different forms and should not be construed as limited to the embodiments set forth herein. Rather, these embodiments are provided so that this disclosure will be thorough and complete, and will fully convey the scope of the disclosure to those having ordinary skill in the art.

In addition, the term "unit" or "assembly" used herein signifies one unit that processes at least one function or operation, and may be realized by hardware, software, or a combination thereof.

In addition, relational terms, such as "first" and "second," are used in this specification only to distinguish between the same elements. The elements are not limited as to the sequence therebetween in the following description.

In addition, relational terms, such as "inside" and "outside," are used in this specification only to distinguish between the relative positions of elements. The elements are not limited as to the positions thereof in the following description.

The present disclosure provides technology for a withdrawal-type sun visor. Referring to FIGS. 2-6B, the present disclosure relates to a withdrawal-type sun visor configured such that a sun visor assembly 100 is retracted in a storage recess 240 formed in a housing 200, which is located at a roof panel, and is withdrawn to a position corresponding to at least a portion of a windshield glass (a front glass of a vehicle) in response to a user request (switching on).

Furthermore, the withdrawal-type sun visor according to the present disclosure includes a driving unit 300 for automatically withdrawing the sun visor assembly 100 under the control of a controller 400. The driving unit 300, which so includes at least two motors, is configured such that the sun visor assembly 100 is protruded from the inside of the roof panel in the direction parallel to the roof and is turned about one end of the housing 200 by a predetermined angle.

In addition, the driving unit 300 is configured such that, when the withdrawal-type sun visor according to the present disclosure is extended, the sun visor assembly 100 is protruded in the horizontal direction and is then turned. The driving unit 300 is also configured such that, when the withdrawal-type sun visor 10 is retracted into the roof panel, the sun visor assembly 100 is turned and is then moved in the longitudinal direction of the housing 200 in the state of being parallel to the housing 200.

Figure 2:
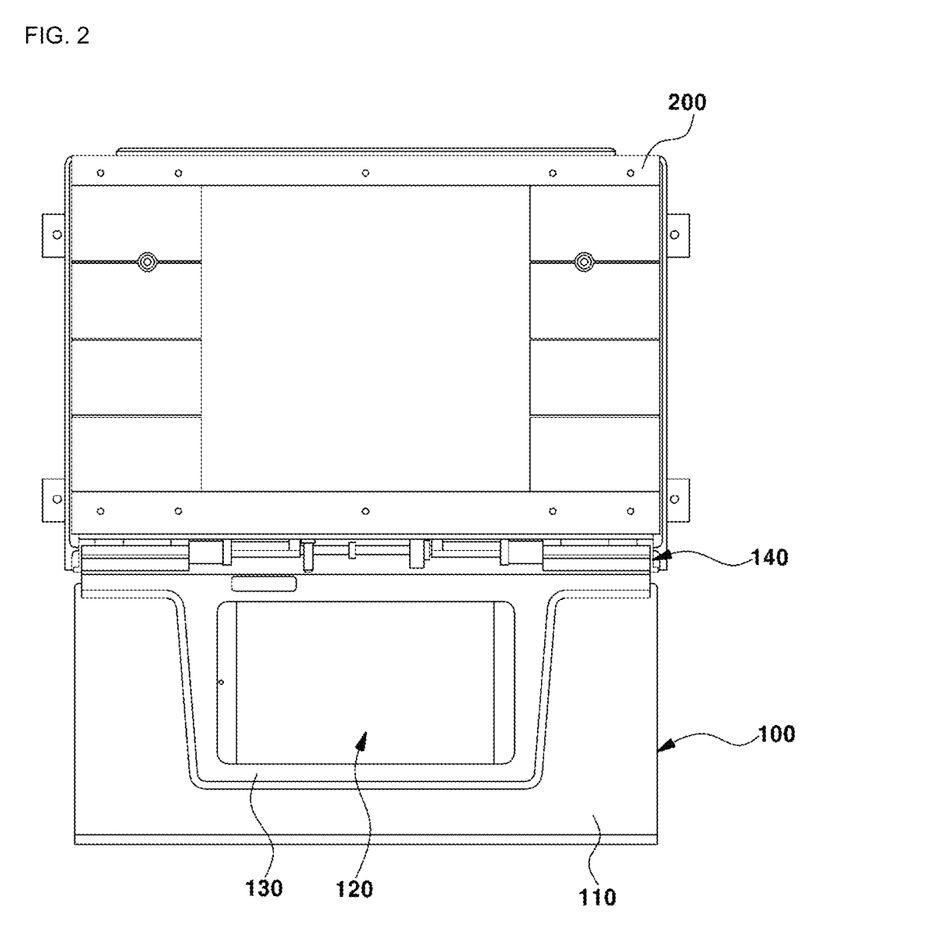
FIG. 2 is a view showing the construction of a withdrawal-type sun visor according to an embodiment of the present disclosure.
Figure 3:
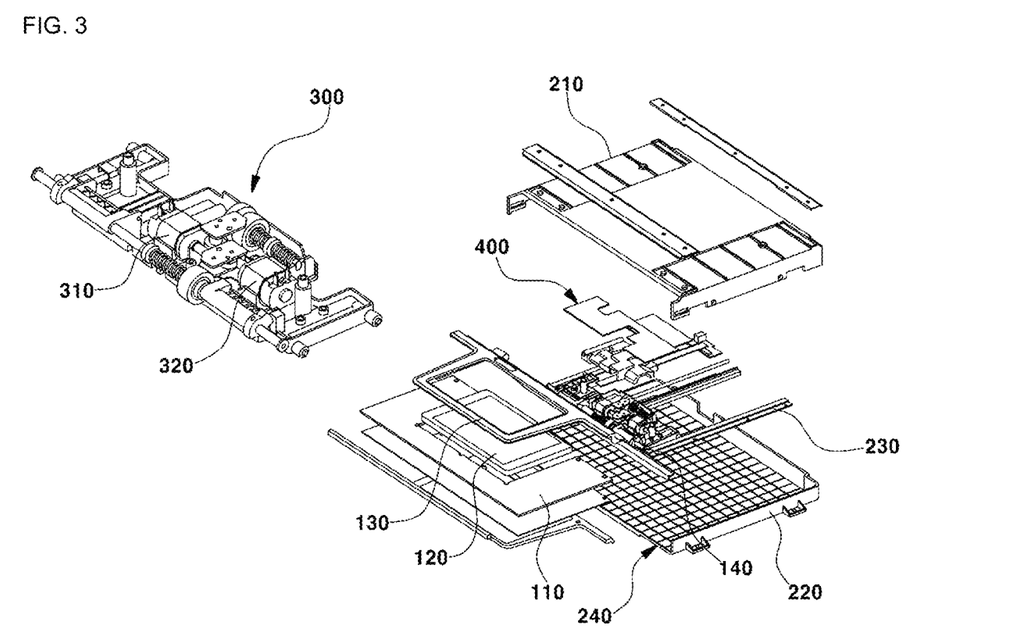
FIG. 3 is a view showing components of the withdrawal-type sun visor according to an embodiment of the present disclosure.

FIG. 2 is a front view showing a withdrawal-type sun visor according to an embodiment of the present disclosure. FIG. 3 is a view showing components of the withdrawal-type sun visor.

The sun visor assembly 100, which includes a display unit 120 and a discoloration unit 110, is located at the roof panel, is located in the housing 200, which has therein the storage recess 240, and is configured to be withdrawn in response to a user request (switching on).

The housing 200 is configured to be fixed to the roof panel and may be configured to be hidden from the interior of a vehicle by a roof lining, i.e., a headliner. The storage recess 240 may be located at one end of the housing 200, at which the windshield glass and the roof panel face each other, in an open state.

The discoloration unit 110 may be made of a polymer-dispersed liquid crystal (PDLC) film. The discoloration unit 110 is configured such that the transmissivity of the discoloration unit 110 is variable depending on the voltage applied to the discoloration unit 110.

The discoloration unit 110 according to the present disclosure is configured to be connected by wire to a power source (not shown) inside the vehicle via a cover unit 130 such that power is supplied to the discoloration unit 110 under the control of the controller 400, which is located inside the housing 200.

In one example, the transmissivity of the discoloration unit 110, which is made of a polymer-dispersed liquid crystal film, is adjusted such that the discoloration unit is in a transparent state when power is supplied to the discoloration unit 110. The transmissivity of the discoloration unit 110 is adjusted such that the discoloration unit is in an opaque state when no power is supplied to the discoloration unit 110.

In other words, the discoloration unit 110 is configured to enclose at least a portion of the display unit 120 in order to selectively block incident light from a light source outside the vehicle.

The display unit 120 is configured to be enclosed by the discoloration unit 110. The cover unit 120 is configured to cover at least a portion of the display unit 120. The cover unit 130 is located on at least one of the front surface or the rear surface of the display unit.

Figure 4:
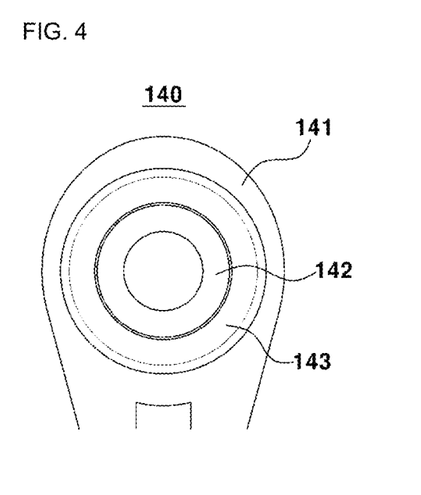
FIG. 4 is a sectional view showing the construction of a turning shaft of a sun visor assembly according to an embodiment of the present disclosure, the turning shaft being configured as a dual shaft.
Figure 5A:
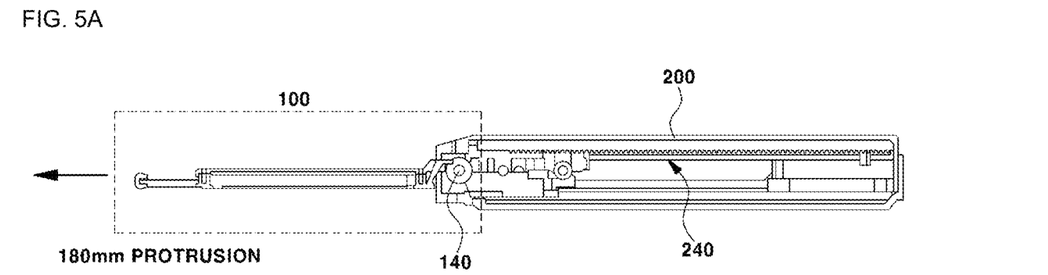
FIG. 5A is a view showing the sun visor assembly according to an embodiment of the present disclosure and that the sun visor is protruded from a housing in the horizontal direction.
Figure 5B:
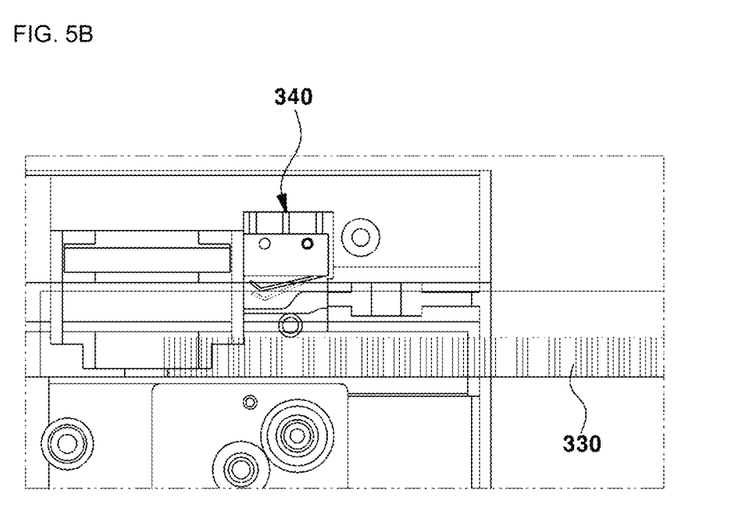
FIG. 5B is a view showing the coupling relationship between the sun visor assembly according to an embodiment of the present disclosure and the housing when the sun visor assembly is protruded from the housing in the horizontal direction.

As shown in FIGS. 4 and 5, a dual shaft 140 may be provided at one end at which the cover unit 130 and the housing 200 face each other. The sun visor assembly 100 is turned about the dual shaft 140. The cover unit 130, configured to enclose the display unit 120, is configured to be integrally fastened to an inner shaft 142. The discoloration unit 110 is configured to be fixed to an outer shaft 141. In an embodiment of the present disclosure, the dual shaft 140 may extend through the cover unit 130.

In one example, the dual shaft 140 is configured to receive a turning force through a second motor 320 such that the entirety of the sun visor assembly 100 is turned. The dual shaft 140 is configured such that, in the state in which the turning of the sun visor assembly 100 through the second motor 320 is completed, the outer shaft 141, which is fastened to the discoloration unit 110, is further rotatable about the inner shaft 142.

In other words, the maximum radii of turning of the cover unit 130 and the discoloration unit 110, which are fastened to the dual shaft 140, may be set so as to be different from each other. The outer shaft 141, to which the discoloration unit 110 is fastened, is configured to be rotatable to a greater rotational angle than the inner shaft 142, to which the cover unit 130 is fastened.

A damper unit 143 may be provided between the inner shaft 142 and the outer shaft 141 so as to absorb an impact when the outer shaft 141 is turned about the inner shaft 142. In addition, the damper unit 143 may include a plurality of concave portions, which allow the angle by which the outer shaft 141 is further rotatable about the inner shaft 142 to be set. One surface of the outer shaft 141, which faces the damper unit 143, is configured to be inserted into and fixed in one of the concave portions.

Furthermore, the outer shaft 141 may be further turned by the driving force from the second motor 320. Alternatively, the outer shaft 141 may be configured to be further turned by a manual turning force.

As shown in FIG. 3, the housing 200, including the storage recess 240, may be divided into an upper housing 210 and a lower housing 220. One end of the housing 200, which faces the sun visor assembly 100, is open to thus form the storage recess 240.

Furthermore, the driving unit 300 is fastened to one end of the sun visor assembly 100 to supply a driving force to the sun visor assembly 100 in the horizontal direction or in the turning direction. The driving unit 300 may be located inside the housing 200 such that power from the vehicle is supplied to the driving unit 300.

The driving unit 300 is configured to be movable integrally with the sun visor assembly 100 along a rack gear 330, which is located inside the housing 200. In one example, a first motor 310 of the driving unit 300 is gear-connected to the rack gear 330. The driving unit 300 is configured to be moved along the rack gear 330 in the horizontal direction according to the turning of the first motor 310.

Consequently, the sun visor assembly 100, one end of which is fastened to the driving unit 300, is configured to be moved simultaneously with the driving unit 300 in the horizontal direction according to the turning of the first motor 310.

A guide unit 230 is located inside the housing 200. The driving unit 300 is moved by the guide unit 230 along the inside of the housing 200 in the horizontal direction. Furthermore, the guide unit 230 may be configured to guide the movement of the sun visor assembly 100, which is retracted into the storage recess 240.

After the sun visor assembly 100 is moved in the horizontal direction, the dual shaft 140, which extends through the cover unit 130, is turned through the second motor 320. In other words, the driving unit 300 is configured to move the sun visor assembly 100 in the horizontal direction and then to turn the sun visor assembly 100.

In one example, in an embodiment of the present disclosure, the sun visor assembly 100 is configured to be turned 72 degrees and is located so as to have an angle substantially corresponding to the windshield glass of the vehicle.

The controller 400, which is configured to supply power to the discoloration unit 110, is located inside the housing 200. The controller 400 determines whether power has been supplied to the discoloration unit 110 based on the amount of light outside the vehicle received from an automatic light sensor (not shown).

Furthermore, in an embodiment of the present disclosure, the amount of light in the vehicle is measured using a user's portable device (not shown), and the measured amount of light is transmitted to the controller 400. The controller 400 is configured to compare the measurement value received through the portable device with the measurement value received from the automatic light sensor and then to selectively adjust the transmissivity of the discoloration unit 110.

In an embodiment of the present disclosure, short-range communication may be performed between the vehicle and the user's portable device using at least one of Bluetooth™, Radio Frequency Identification (RFID), Infrared Data Association (IrDA), Ultra-Wideband (UWB), ZigBee, Nearfield Communication (NFC), Wireless-Fidelity (Wi-Fi), Wi-Fi Direct, or Wireless Universal Serial Bus (Wireless USB).

In one case, the difference between the amount of light outside the vehicle and the amount of light in the vehicle is equal to or greater than a predetermined reference value. In such a case, the controller is configured to determine that the user is subjected to glare and to supply power to the discoloration unit 110.

FIG. 4 is a side view showing the above-mentioned dual shaft 140 according to an embodiment of the present disclosure.

The cover unit 130 is configured to enclose the display unit 120. The dual shaft 140 extends through one end of the cover unit 130, at which the cover unit 130 and the driving unit 300 face each other.

The cover unit 130, which encloses the display unit 120, is fixed to the inner shaft 142 of the dual shaft 140. One end of the discoloration unit 110 is fixed to the outer shaft 141 of the dual shaft 140.

The discoloration unit 110 is configured to be further turnable about the sun visor assembly 100, which is turned by the second motor 320. The outer shaft 141 is further turned about the inner shaft 142 in one direction or in opposite directions such that the discoloration unit 110 is further turnable.

The outer shaft 141 is configured to be further turned about the inner shaft 142. The damper unit 143 is located between the outer shaft 141 and the inner shaft 142. The damper unit 143 is configured to absorb an impact that is generated when the outer shaft 141 is turned. The damper features of the damper unit 143 is provided in the outer circumferential surface thereof. The damper unit 143 is provided with a plurality of concave portions in the outer surface thereof. The inner circumferential surface of the outer shaft 141 is caught in one of the concave portions in response to further turning of the outer shaft 141, whereby the additional amount of turning of the discoloration unit 110 is set.

FIG. 5A is a side view showing the state in which the sun visor assembly is withdrawn according to the driving of the first motor 310 in an embodiment of the present disclosure. FIG. 5B shows the construction of a limit switch 340, which is fastened to the rack gear 330.

As shown, the sun visor assembly 100 is configured to be horizontally withdrawn in the longitudinal direction of the housing 200. The sun visor assembly 100 is switched to a withdrawn state as the result of the movement of the driving unit 300, which is connected to one end of the sun visor assembly 100 so as to be moved in the longitudinal direction of the housing 200.

The driving unit 300 is configured to be moved along the rack gear 330, which is fixed to the inside of the housing 200. The driving unit 300 is moved in the horizontal direction by the length of the rack gear 33, which is located inside the housing 200, in the longitudinal direction thereof.

In an embodiment of the present disclosure, the sun visor assembly 100 is configured to be withdrawn in the direction parallel to the housing 200. The sun visor assembly 100 may be configured to protrude 180 mm.

In other words, the first motor 310 of the driving unit 300 supplies a driving force to the rack gear 330, which is fixed to the inside of the housing 200. The sun visor assembly 100 is withdrawn in the direction parallel to the housing 200, and the entirety of the driving unit 300 is moved simultaneously with the sun visor assembly 100 in the horizontal direction.

The driving unit 300 is configured to be moved along the rack gear 33, which is located inside the housing 200, by the driving force from the first motor 310. When the sun visor assembly 100 is located at the maximally protruding position, the coupling between the limit switch 340 and the rack gear 330 is released, whereby the driving force from the first motor 310 is interrupted.

Consequently, the supply of power to the first motor 310 is interrupted at the maximally protruding position of the sun visor assembly 100.

In the case in which the sun visor assembly 100 is configured to be retracted into the storage recess 240 according to a user request, unlike the above case, the controller 400 is configured to supply a driving force to the first motor 310. The driving unit 300 and the sun visor assembly 100 are configured to be moved into the housing 200 irrespective of whether the limit switch 340 and the rack gear 330 are fastened to each other.

Figure 6A:
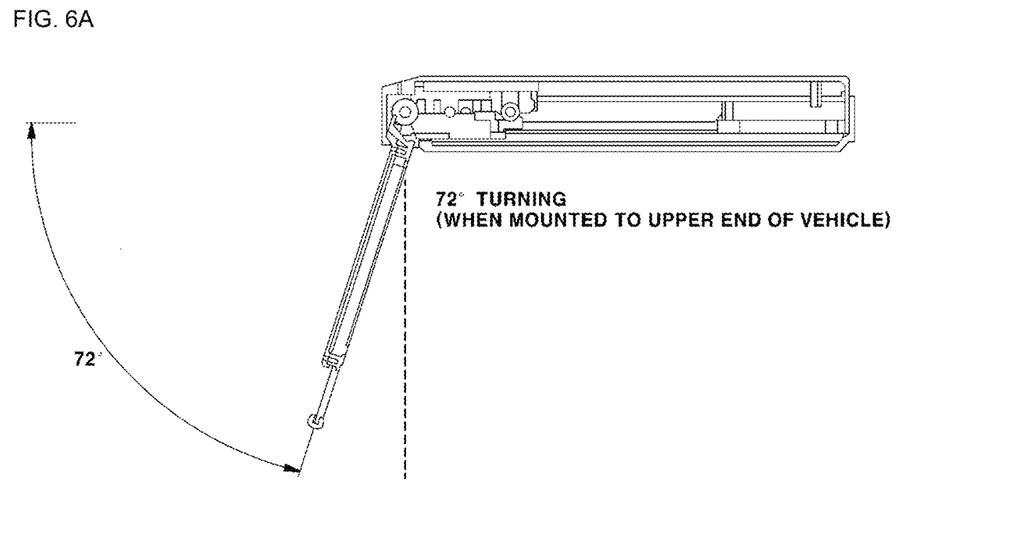
FIG. 6A is a view showing that the sun visor assembly according to an embodiment of the present disclosure is turned about a dual shaft.
Figure 6B:
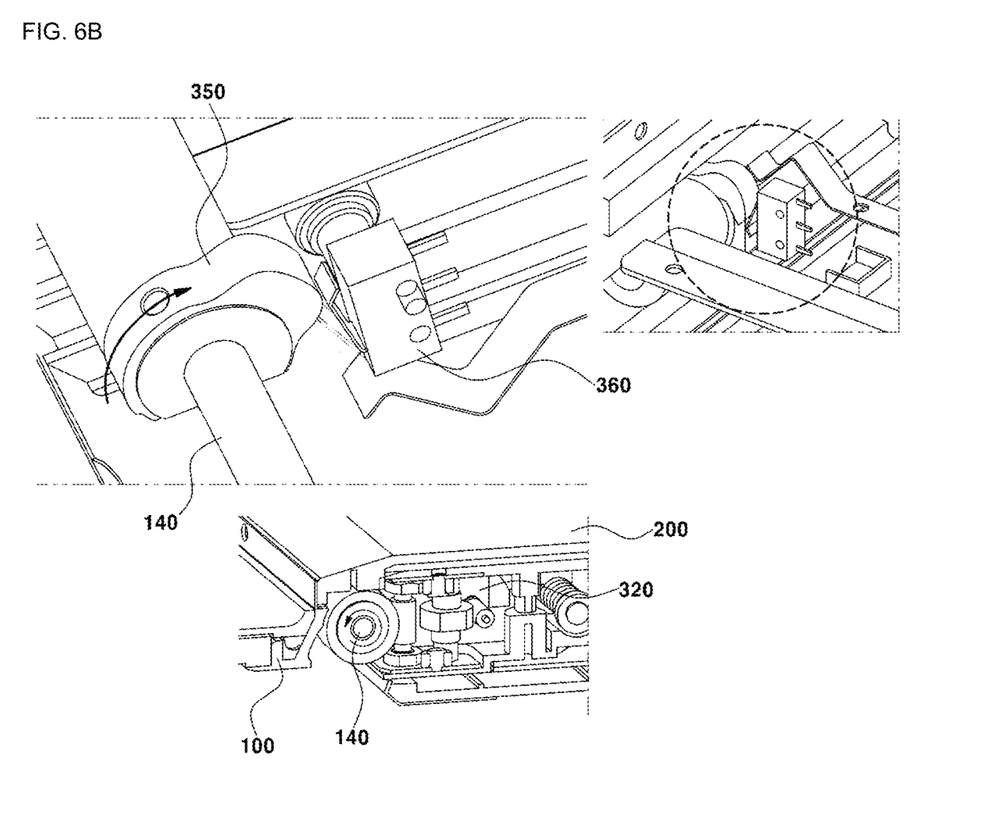
FIG. 6B is a view showing the coupling relationship between the sun visor assembly according to an embodiment of the present disclosure and a driving unit, which turns the sun visor assembly about a dual shaft.

FIG. 6A is a side sectional view showing the construction in which the sun visor assembly 100 is switched to a turned state when the sun visor assembly 100 is located at the maximally protruding position. FIG. 6B shows the driving relationship of the dual shaft 140 when the sun visor assembly is switched to the turned state.

In the case in which the sun visor assembly 100 is located at the maximally protruding position, the supply of the driving force from the first motor 310 is interrupted. The dual shaft 140 is turned by a driving force from the second motor 320.

In other words, a rotation limit switch 360 is turned on such that power is supplied to the second motor 320 through a cam 350. The cam 350 is located at one end of the sun visor assembly 100, whereby the dual shaft 140 is turned in response to the driving of the second motor 320.

Furthermore, the cam 350 is configured to be located at the dual shaft 140 and contacts the rotation limit switch 360 such that the driving force from the second motor 320 is supplied to the cam. Consequently, the shape of a protrusion formed along the outer circumferential surface of the cam 350 may be set based on the turning angle of the dual shaft 140.

In an embodiment of the present disclosure, the shape of the cam 350 may be configured such that the dual shaft 140 is turned 72 degrees. The cam 350, which faces the rotation limit switch 360, is configured to include a portion formed so as to be protruded 72 degrees about the dual shaft 140.

When the dual shaft 140 is turned, the protrusion formed along the outer circumferential surface of the cam 350 is configured such that the rotation limit switch 360 is turned on.

In a region in which the protrusion of the cam 350 is present, the cam 350 contacts the rotation limit switch 360. Power is supplied to the second motor 320, whereby the sun visor assembly 100 is turned about the dual shaft 140. In a region in which the protrusion of the cam 350 is not present, the rotation limit switch 360 is turned off such that no power is supplied to the second motor 320, whereby the turning of the sun visor assembly 100 is completed.

As shown in FIG. 6B, the rotation limit switch 360 is pushed by the cam 350, which is located at the dual shaft 140. Power is supplied to the second motor 320 and the dual shaft 140 is turned by the driving force from the second motor 320.

In one example, the turning angle of the dual shaft, which is integrally connected to the sun visor assembly 100, is set depending on the region of the protrusion of the cam 350.

As is apparent from the foregoing, the present disclosure may have the following effects from the construction, coupling, and use relationships of the embodiments disclosed herein.

The present disclosure provides a withdrawal-type sun visor including a display unit, whereby it is possible to improve user convenience.

In addition, the withdrawal-type sun visor according to the present disclosure is configured such that the transmissivity of a discoloration unit is adjusted based on the amount of light introduced into a vehicle. It is thus possible to provide a riding environment in which external light is blocked.

The effects of the present disclosure are not limited to those mentioned above. It should be understood that the effects of the present disclosure include all effects that can be inferred from the foregoing description of the present disclosure.

The above detailed description illustrates the present disclosure. In addition, the foregoing describes embodiments of the present disclosure. The present disclosure may be used in various different combinations, changes, and environments. In other words, variations or modifications can be made within the conceptual scope of the present disclosure, equivalents to the disclosure of the present disclosure, and/or the scope of technology and knowledge in the art to which the present disclosure pertains. The embodiments describe the best mode for realizing the technical concept of the present disclosure, and variations required for the concrete application and use of the present disclosure are possible. Therefore, the above detailed description does not limit the present disclosure disclosed above. In addition, the appended claims should be interpreted to include other embodiments.

What is claimed is:

1. A sun visor comprising:
a housing received in a roof panel, the housing having a storage recess therein; and
a sun visor assembly configured to be received in the housing and to be withdrawn toward a front glass of a vehicle,
wherein the sun visor assembly includes,
a display unit comprising a display region, and
a discoloration unit configured to enclose at least a portion of the display unit, a transmissivity of the discoloration unit being adjustable,
wherein the sun visor further comprises a driving unit connected to one end of the sun visor assembly for supplying a driving force such that the sun visor assembly is withdrawn,
wherein the driving unit is fastened to a cover unit configured to enclose the display unit,
wherein the cover unit is fastened to an inner shaft of a dual shaft, which extends through the cover unit, the discoloration unit is fastened to an outer shaft, which is driven independently of the inner shaft, and
wherein, when the dual shaft is turned by the driving unit, the outer shaft and the inner shaft are simultaneously turned.

2. The sun visor according to claim 1, wherein the driving unit comprises:
a first motor for linearly moving the sun visor assembly such that the sun visor assembly is switched to a withdrawn state; and
a second motor for turning the sun visor assembly such that the sun visor assembly is switched to a turned state,
wherein a controller is configured such that the sun visor assembly is switched to the withdrawn state and is then switched to the turned state.

3. The sun visor according to claim 1, wherein a damper unit is provided between the inner shaft and the outer shaft.

4. The sun visor according to claim 1, wherein the outer shaft is configured to be turned independently of the inner shaft.

5. The sun visor according to claim 1, wherein the driving unit, which is fastened to one end of the sun visor assembly, is configured to be moved along a rack gear, which is located inside the housing.

6. The sun visor according to claim 1, further comprising a controller located inside the housing for adjusting the transmissivity of the discoloration unit.

7. The sun visor according to claim 1, further comprising an automatic light sensor for measuring an amount of light.

8. The sun visor according to claim 7, further comprising a controller configured to adjust the transmissivity of the discoloration unit based on the amount of light received from the automatic light sensor.

9. The sun visor according to claim 7, further comprising a controller configured to compare an amount of light received through a portable device located in the vehicle with the amount of light received from the automatic light sensor and then to adjust the transmissivity of the discoloration unit.

10. The sun visor according to claim 1, further comprising a guide unit provided at each side of the storage recess for guiding the sun visor assembly or the driving unit so as to be moved in a horizontal direction.

* * * * *